United States Patent [19]

Yosim

[11] 4,296,074
[45] Oct. 20, 1981

[54] METHOD OF DECLADDING

[75] Inventor: Samuel J. Yosim, Woodland Hills, Calif.

[73] Assignee: Rockwell International Corporation, El Segundo, Calif.

[21] Appl. No.: 894,678

[22] Filed: Apr. 10, 1978

[51] Int. Cl.³ ............................................. G21C 19/34
[52] U.S. Cl. ................................... 423/4; 75/84.1 A; 75/84.1 R; 423/255
[58] Field of Search ................ 423/4, 255; 75/84.1 R, 75/84.1 A

[56] References Cited

U.S. PATENT DOCUMENTS

| | | | |
|---|---|---|---|
| 1,835,024 | 12/1931 | Driggs | 423/255 X |
| 2,446,780 | 8/1948 | Newton | 75/84 R |
| 2,784,054 | 3/1957 | Carter et al. | 75/84.1 R |
| 2,827,405 | 3/1958 | Evans | 423/4 X |
| 2,849,313 | 8/1958 | Mansfield | 75/84 R |
| 2,915,362 | 12/1959 | Fried et al. | 75/84.1 R |
| 2,917,382 | 12/1959 | Feder et al. | 75/84.1 R |
| 2,962,371 | 11/1960 | McGeary | 75/84.1 R |
| 2,970,050 | 1/1961 | Knighton | 75/84.1 R |
| 3,135,599 | 6/1964 | Heidt | 75/84.1 R X |
| 3,578,419 | 5/1971 | Welty | 423/4 |
| 3,715,204 | 2/1973 | De Grazio et al. | 75/84.1 R |
| 3,758,669 | 9/1973 | Potter et al. | 423/255 X |
| 4,024,068 | 5/1977 | Cech | 423/4 X |

OTHER PUBLICATIONS

Katz, J. J. et al. *The Chemistry of Uranium*, pp. 183-213, McGraw Hill, N.Y. 1951.

*Primary Examiner*—Richard E. Schafer
*Attorney, Agent, or Firm*—Clark E. DeLarvin; Henry Kolin

[57] ABSTRACT

A method of decladding an assembly comprising an element selected from the group consisting of uranium, thorium and mixtures thereof, clad in stainless steel, zirconium, or an alloy consisting essentially of zirconium and containing minor amounts of nickel, chromium, tin, iron or combinations thereof. In a first step the cladding is scored or perforated to expose the selected element. Thereafter, the assembly is exposed to a hydrogen atmosphere at an elevated temperature for a time sufficient for the hydrogen and selected element to react and form a hydride. The temperature then is further increased to decompose the hydride back to gaseous hydrogen and the selected element. The hydriding-dehydriding preferably are repeated at least two additional times to ensure complete release of any volatile gases present. The formation of the hydride which has substantially greater volume than the selected element ruptures the cladding assembly and the subsequent dehydriding leaves the selected element in a friable granular form whereby it is readily separable from the cladding material by conventional mechanical means such as sieving or the like.

6 Claims, 1 Drawing Figure

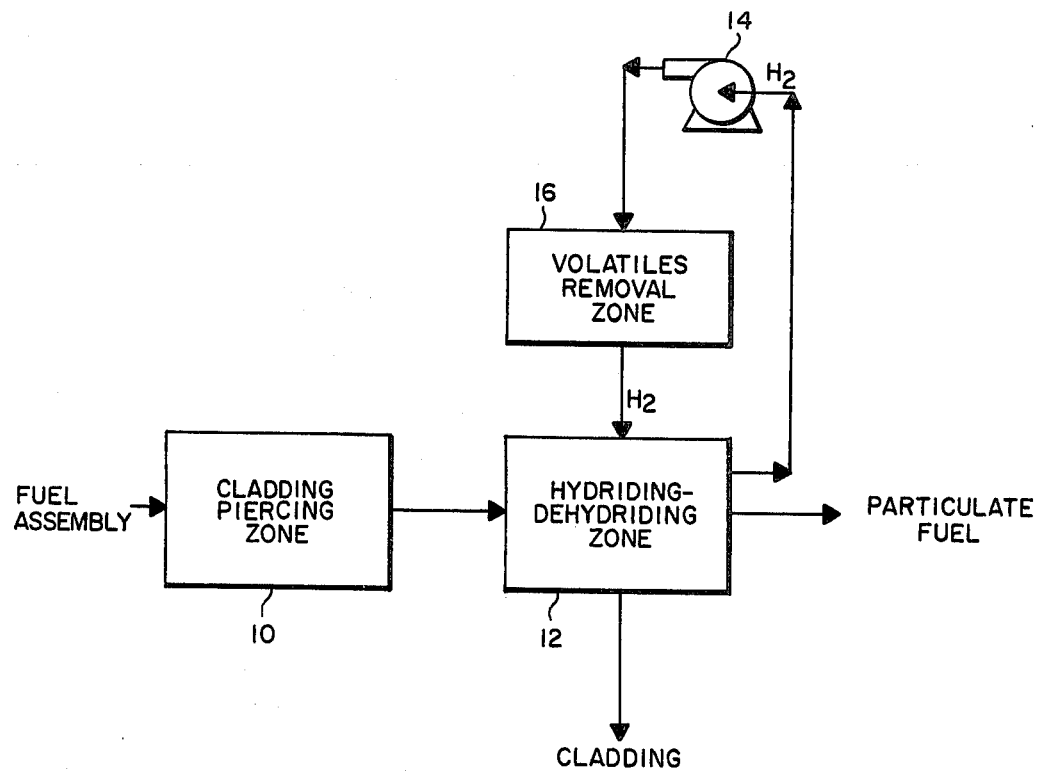

METHOD OF DECLADDING

BACKGROUND OF THE INVENTION

1. Field of the Invention

The present invention relates to the removal of stainless steel, zirconium or zirconium alloy cladding materials from a metallic element selected from the group consisting of uranium, thorium and mixtures thereof. The present invention is particularly applicable to the selective destructive removal of cladding materials from nuclear fuel elements containing fissile or fertile fuels such as uranium, thorium and mixtures thereof.

2. Prior Art

There are numerous types of nuclear power fuel elements. The present invention is particularly applicable to those nuclear fuel elements of the solid type which comprise a body or core of thermal neutron fissionable uranium, thorium or mixtures thereof which may be present in an elemental state or alloyed with zirconium, niobium or other low cross section materials which are clad in a low cross section corrosion resistant material such as stainless steel, zirconium, or zirconium alloys.

Nuclear power fuel elements generally contain two types of nuclear fuel material, both of which are valuable. It is essential that the fuel element contain a fissionable nuclear fuel material such as uranium isotopes U 233 or U 235. Fuel elements also contain nuclear fuel materials that are not originally fissionable, but which can be converted to fissionable material and are, therefore, said to be fertile or potential nuclear fuel materials. For example, U 238 is a fertile material often present in fuel elements in considerable amounts. In some instances as much as 99.3% of the uranium content may be present in the form of U 238 in the case of an unenriched element. During the course of the use of the element in a power reactor, the fissionable material such as U 233 and U 235 releases neutrons. Some of the neutrons are trapped by the fertile but unfissionable U 238 present in the element and the U 238 eventually becomes Pu 239 which is fissionable. In the same way, thorium which is a fertile but unfissionable material, absorbs neutrons to become U 233 which is fissionable and useful as nuclear fuel material.

Fuel elements of the solid type, with which the present invention is particularly applicable, deteriorate due to radiation damage long before the useful content of the fissionable material is used. At the same time, radioactive fission products accumulate in the fuel element. Some are gases and others are solid; however, each is objectionable in reducing the efficiency of the reactor as a whole and each exert some part in the destruction or disintegration of the fuel element. More particularly, many of the fission products have a high neutron capture cross section thus reducing the total amounts of neutrons available for production of thermal energy. In addition, the gaseous fission products build up pressure within the cladding material which can result in permanent structural damage to the elements and possibly to the reactor. Since these deleterious effects occur at a time when only a small fraction of the fissile values have been burned by the fission process and since the unburned fuel is too valuable to be wasted, it advantageously is reprocessed to render it fit for reuse.

None of the heretofore known methods for recovering fuel and fertile uranium or thorium from such elements has been completely satisfactory.

One method, for recovering unburned fissile and fertile fuel values from solid neutron irradiated fuel elements, involves dissolution of the cladding and the fuel followed by a liquid-liquid solvent extraction process in which an aqueous nitrate feed solution containing said values is selectively extracted by contact with an organic aqueous immiscible extractant. An example of a solvent extraction process for recovering uranium values, for example, is found in U.S. Pat. No. 2,848,300.

A major disadvantage of aqueous dissolution of cladding, however, is that large aqueous feed volumes containing dissolved metals must be carried through the solvent extraction process. This in turn leads to a large radioactive waste volume requiring expensive waste storage and handling. In addition, the solutions generally are highly corrosive and have a high chloride content. Removal of chloride from the aqueous feed must be accomplished prior to solvent extraction for recovery of the thorium or uranium.

In an attempt to reduce the volume of high level radioactive waste pollution, various other methods have been proposed, such as separately dissolving the cladding material in concentrated sulfuric acid thus making the fuel core available for ready dissolution in a nitric acid solution. However, a cladding material such as stainless steel is relatively passive in sulfuric acid and even when it does react, there is a high probability that cross contamination between the decladding solution and the core solution will result, thus further complicating the problem of recovering the fuel.

U.S. Pat. No. 2,827,405 suggests a method of desheathing fuel rods of uranium metal bars by puncturing the sheath to expose the uranium core at a plurality of points. The rod then is reacted with steam at an elevated temperature to oxidize the uranium and break the bond between the sheath and the uranium. The fuel is recovered as an oxide requiring expensive processing to convert it back to a metal.

Another method suggested in U.S. Pat. No. 2,962,371 comprises reacting the element at an elevated temperature with essentially pure anhydrous hydrogen for a time sufficient to hydride the cladding so that it falls from the core. This invention however, is concerned with zirconium-clad fuel elements although it is suggested that it is also applicable to elements that are clad in alloys of zirconium.

Another process for recovering the core of a zirconium-clad fuel element is disclosed in U.S. Pat. No. 3,007,769. The process comprises immersing the clad element in a substantially neutral solution of ammonium fluoride to effect the dissolution of the zirconium and separate the neutron fissionable material values from the solution.

U.S. Pat. No. 3,089,751 suggests a process for the selective separation of uranium from ferritic stainless steels. In accordance with the process disclosed therein, a nuclear fuel element consisting of a core of uranium clad in a ferritic stainless steel is heated to a temperature in the range of 850° C. to 1050° C. for a period of time sufficient to render the cladding susceptible to intergranular corrosion. The heated element is then cooled rapidly to a temperature range of 850° C. to 615° C. and then to about room temperature. The cooled element then is contacted with an aqueous nitrate solution to selectively and quantitatively dissolve the uranium from the core.

Gas phase processes for effecting the dissolution of fuel or the cladding material are disclosed in U.S. Pat.

Nos. 3,149,909; 3,156,526 and 3,343,924. The problem of handling and containing gaseous fuel, however, is even greater than that for liquid phase processes.

U.S. Pat. No. 3,929,961 suggests a method of treating a nuclear fuel element enclosed in a stainless steel metal sheath which comprises disposing the fuel element with a portion thereof in an induction coil, subjecting the induction coil to a radio frequency magnetic field to induce local induction heating of the metal sheath sufficient to raise the temperature of the portion of the sheath within the coil to its melting temperature and effect local melting therein. The fuel element is moved axially relative to the induction coil with continued heating to rupture the metal sheath. The fuel values are subsequently recovered by dissolution.

Thus it is seen that the prior art processes either convert the fuel to an oxide or at some point require liquid or gas phase processing with all of the problems associated therewith.

SUMMARY OF THE INVENTION

The present invention provides a method of treating an assembly comprising an element selected from the group consisting of uranium, thorium and mixtures thereof encased in a cladding of stainless steel or a zirconium alloy to separate the selected element from the cladding. In accordance with the present method, the assembly is subjected to a scoring or perforating step to expose the selected element. Thereafter, the assembly is exposed to hydrogen at a pressure of from about 0.5 to 2.0 atmospheres (360 to 1400 torr) and a temperature of 450° C. to 680° C. to form a hydride of the element. The hydride, having a greater volume than the elemental metal, expands, rupturing the cladding material. Thereafter, the temperature is further increased to a range of from about 700° C. to 900° C. to decompose the hydride back to the element. The dehydriding results in the element being in the form of friable particulates such that after at least one and preferably after about three successive hydriding-dehydriding steps, the selected element is readily recoverable from the cladding material, utilizing conventional mechanical separation techniques such as sieving or the like. In a particularly preferred embodiment of the invention, during the hydriding step, the temperature is cycled between about 500° C. and 650° C. to enhance the completeness of the hydriding and maximize the removal or evolution of any volatile compounds contained within the assembly. The present invention is particularly applicable to the treatment of irradiated fuel elements for the recovery of fissionable and fertile values therefrom.

BRIEF DESCRIPTION OF THE DRAWING

The sole FIGURE of the drawing depicts in the form of a flow sheet the various steps of a process in accordance with a preferred embodiment of the present invention for removing the cladding from an assembly comprising a fuel such as uranium, thorium or mixtures thereof encased in a cladding material of stainless steel, zirconium or zirconium alloys.

DESCRIPTION OF THE PREFERRED EMBODIMENT

The present invention provides a method for the treatment of an assembly comprising a cladding material and a core of uranium, thorium or mixtures thereof to separately recover the cladding material and the core. The method is particularly applicable to the treatment of a nuclear fuel element comprising a cladding material containing a metallic fuel such as fissile or fertile uranium, thorium and combinations thereof. The cladding material generally comprises a stainless steel which consists principally of iron alloyed with chromium and containing minor amounts of other metal additives. The present invention also is applicable to zirconium or zirconium alloy cladding materials. The zirconium alloy generally consists principally of zirconium and contains minor amounts of one or more alloying materials such as nickel, chromium, tin or iron. For convenience, the present invention will be described with respect to its particularly preferred application, namely, the treatment of a nuclear fuel assembly.

Referring to the sole FIGURE, the fuel assembly first is introduced into a cladding piercing zone 10 where at least a portion of the cladding material is pierced, perforated, scored, sheared or the like to at least partially expose the thorium or uranium core. The precise mechanical means used to accomplish the exposure of the core is not particularly critical. However, it generally is preferred to expose at least a portion of the surface of the core at intervals of about ½ to 1½ inches throughout the length of the fuel assembly.

The perforated or scored fuel assembly is next introduced into a hydriding-dehydriding zone 12. It will be appreciated that both the piercing of the cladding and the hydriding-dehydriding could be accomplished in a single zone; however, in accordance with the particularly preferred embodiment set forth herein, each operation is performed in separate zones.

In hydriding-dehydriding zone 12, the assembly is reacted with hydrogen at a hydrogen pressure of from about 0.5 to 2 atmospheres (360 to 1400 torr) and preferably at about one atmosphere (760 torr). Lower pressures substantially reduce the hydriding reaction rate and at higher pressures the reaction rate is not significantly increased. The temperature during the hydriding reaction is maintained within a range of from about 400° C. to 650° C. When the fuel is uranium, the temperature is optimally maintained within a range of about 450° C. to 600° C. and for thorium, a temperature range of from 500° C. to 650° C. is preferred. In accordance with the particularly preferred embodiment, when the core of the assembly comprises uranium, thorium or mixtures thereof, the temperature is cycled during the hydriding process such that the core is exposed to both an optimum hydriding temperature and an optimum hydrogen diffusion temperature. The time required to achieve substantially complete reaction will vary, of course, depending upon the size and shape of the metallic thorium or uranium core as well as the amount of surface area of the core exposed in the cladding and piercing operation. Generally, when the assembly is treated in accordance with the preferred conditions set forth herein, it is found that the reaction is substantially complete in a time of from about 15 to 90 minutes.

Following the hydriding reaction, the temperature in zone 12 is increased to from about 700° C. to 900° C. to decompose the hydride to elemental metal and release the hydrogen which is withdrawn via a pump 14. When the fuel assembly is one which has been irradiated and contains gaseous fission products, the hydrogen withdrawn preferably is introduced into a volatile removal zone 16 where the gaseous stream is treated, for example by condensation, to remove a major portion of the volatile fission products. It is a particular advantage of the present invention that forming the hydride and then dehydriding the product so formed, releases substantially all of the volatile fission products. In addition, during the hydriding step, the hydride is formed as discrete particles of substantially increased volume. These particles of increased volume tend to split or rupture the cladding material and increase the size of the openings therethrough such that after the subsequent dehydriding, the core material is left in the form of small, friable discrete particles which are readily recoverable from the assembly by simple mechanical means such as sieving or mechanical agitation to separate the particulate core material from the larger substantially intact pieces of cladding material. Advantageously, the hydriding-dehydriding step is repeated at least once and preferably twice to ensure complete release of any volatile fission products present as well as to ensure that substantially all of the elemental core material has been exposed to and reacted with hydrogen at least once. The resulting particulate fuel material is readily processible to produce new fuel assemblies by enrichment, if necessary, and sintering or arc casting to reform pellets of the fuel. Thus, it is seen that the present invention provides a method for treating such assemblies without the necessity of complex and expensive gaseous or liquid phase processing. Further, in accordance with the present invention, any plutonium which may be present is never isolated but remains with the fuel in such a dilute form, however, as to substantially negate the possibility of it being used in the production of a nuclear weapon.

The following example is set forth to more clearly illustrate a specific embodiment of the present invention as applied to the decladding of a nuclear fuel element and recovery and separation of the valuable constituents of the core from the undesirable radioactive gaseous fission products.

EXAMPLE

The purpose of this example is to demonstrate the method of the present invention to (1) declad the fuel, (2) comminute the fuel so it will fall free from the cladding, (3) release the volatile fission product, and (4) restore the fuel to its initial chemical form (i.e., metal).

To determine the ability of the present method to release volatile fission products without the necessity of using radioactive materials, it was determined to monitor the radon evolved during the tests. Radon is a decay daughter of thorium, uranium and plutonium that is produced in situ within the fuel, just as xenon and krypton is produced during fission. Calculations indicate that the radon contained in one gram of metallic thorium that had decayed for a year since it was arc cast was sufficient to produce several hundred disintegrations per minute. Therefore, monitoring the radon radioactivity when thorium is pulverized in accordance with the present method would provide an excellent measure of the amount of volatile fission products which would be released during the treatment of the irradiated thorium fuel.

A simulated fuel assembly was built which comprised $\frac{1}{4} \times \frac{1}{4} \times 3$-inch square strips of thorium which were rounded and cut into $\frac{1}{2}$-inch lengths to simulate fuel pellets. The pellets were loaded into a 4-inch long $\times \frac{1}{4}$-inch O.D. piece of stainless steel tubing which had a wall thickness of 0.112 inches. After the pellets were loaded, the tubing was crimped on each end and a $\frac{1}{8}$-inch diameter hole was punched in the tubing at 1-inch intervals along one side. The simulated clad fuel assembly was then treated at various hydriding-dehydriding conditions in accordance with the present invention. After treatment, the assembly was removed from the reaction chamber and examined. The conditions and results are set forth in the following table.

For the tests in the table, it was found that the thorium hydriding and dehydriding temperatures appear to be most rapid around 600° C. and 900° C., respectively. Based on the differential hydrogen pressure in the system, it appears that maximum hydrogen absorption reaction occurred around 600° C. Hydrogen pressure in the closed system increased as a result of the initial heatup of thorium pellets to 350° C. At 350° C., the pressure leveled off and then decreased slowly with continued heating. The decrease in pressure became more pronounced in the 600° C. range and continued to decrease (indicating continued hydrogen absorption and reaction) until a temperature of about 680° C. was reached. Sharp pressure increases were observed when the temperature was increased to above 700° C. Maximum pressure increase was obtained at about 900° C. Thus, hydriding occurs between 350° C. and 680° C. for thorium and is most rapid around 680° C. while dehydriding occurs above 700° C. and is most rapid around 900° C.

Complete pulverization of the thorium metal by repeated hydriding and dehydriding (three cycles) was readily achieved. Comminution of the metal to less than 400-mesh without mechanical treatment was not achieved. However, the dehydrided metal is extremely friable and readily comminuted to a size of less than 400-mesh by ball milling, pressure screening or the like.

TABLE

PROCESSING OF CLAD THORIUM PELLETS

| Series | Test No. | Pressure (Torr) | | Hydriding | | Dehydriding | | Radon Released* | | |
|---|---|---|---|---|---|---|---|---|---|---|
| | | $H_2$ | Total# | Temp °C. | Time (hr) | Temp °C. | Time (hr) | Cts | % of Total | Accum % |
| 1 | a | 380 | 760 | 520 | 0.25 | 850 | 0.33 | 45 | 1 | — |
| | b | 380 | 760 | 600 | 1 | 800 | 1 | 20 | Nil | — |
| | c | 380 | 760 | 560 | 0.5 | 800 | 0.25 | 4 | Nil | 1 |
| | d | 380 | 760 | 700 | 0.25 | 1000 | 0.25 | Nil | — | 1 |
| | e | 380 | 760 | — | — | — | — | 80 | 1 | 2 |
| | f | 380 | 760 | 500 | 0.5 | 700 | 0.25 | 30 | Nil | 2 |
| 2 | a | 760 | 760 | 525–600 | 2 | 800 | 0.25 | 60 | 1 | 3 |
| | b | 550 | 550 | — | — | — | — | 170 | 2 | 5 |
| | c | 550 | 550 | 500–660 | 3 | 700–800 | 1 | 2350 | 24 | 29 |
| | d | 550 | 550 | 570 | 0.5 | 810 | 0.25 | Nil | — | 29 |
| | e | 550 | 550 | 660 | 0.5 | 710 | 0.25 | Nil | — | 29 |
| | f | 450 | 450 | 400–700 | 3 | 950 | 1.0 | 1500 | 15 | 44 |
| | g | 500 | 500 | — | — | 800 | 0.5 | Nil | — | 44 |

TABLE-continued
PROCESSING OF CLAD THORIUM PELLETS

| Series | Test No. | Pressure (Torr) H₂ | Pressure (Torr) Total# | Hydriding Temp °C | Hydriding Time (hr) | Dehydriding Temp °C | Dehydriding Time (hr) | Radon Released* Cts | Radon Released* % of Total | Radon Released* Accum % |
|---|---|---|---|---|---|---|---|---|---|---|
| | h | 150 | 150 | — | — | — | — | Nil | — | 44 |
| | i | 900 | 900 | 400–650 | 2 | — | — | 750 | 7 | 51 |
| | j | 400 | 400 | — | — | — | — | — | — | — |
| | | | | Cooled to Room Temperature, Disassembled, Cladding Inspected | | | | | | |
| 3 | a | 900 | 900 | 550 | 2 | — | — | 700 | 7 | 58 |
| | b | 900 | 900 | 400–600 | 2 | 900 | 0.3 | 1600 | 16 | 74 |
| | c | 900 | 900 | 500 | 1.5 | 800–900 | 1.0 | 900 | 9 | 83 |
| | d | 900 | 900 | 650 | 0.25 | 870 | 0.25 | Nil | — | 83 |
| | e | 1000 | 1000 | 500 | 0.5 | 800–900 | 1.00 | 400 | 4 | 87 |
| | f | 640–1000 | 640–1000 | 500 | 0.25 | 900 | 0.25 | 1200 | 12 | 99 |
| | g | 1000 | 1000 | 460–560 | 0.5 | 750 | 0.25 | Nil | — | 99 |
| | h | 1000 | 1000 | — | — | — | — | — | — | 99 |
| | | | | Cooled to Room Temperature and Disassembled | | | | | | |

*Total counting rate of radon if completely released = 9850.
Balance of gas was argon.

Substantial amounts of radon were involved during the hydriding-dehydriding of the fuel. The radon counting rate in the hydrogen increased rapidly above 400° C. to a maximum at a temperature of about 900° C. The radon appeared to evolve during both the hydride and dehydride portion of the cycle.

When the foregoing example is repeated, using uranium clad in stainless steel, zirconium or a zirconium alloy, or a mixture of uranium and thorium clad in such alloys, substantially the same results are obtained. Specifically, the uranium, thorium or mixture thereof is reduced to a fine friable particulate form and the cladding material is sufficiently ruptured by the hydride form, so that on subsequent dehydriding, the particles are readily removable from the cladding by mechanical means.

It is readily apparent that the present invention provides an economical, safe and easy to operate method for the recovery and separation of uranium, thorium or mixtures thereof from a cladding material. While the foregoing example and description exemplify what are presently considered to be the preferred embodiments of the invention, it will be appreciated that many changes might be made in the embodiments described. The application of the method of the present invention to other elements clad or sheathed in various metals also will be readily apparent. Thus, the foregoing description is to be construed and interpreted as illustrative only and not in a limiting sense; reference being had to the claims for such latter purpose.

I claim:

1. A method of decladding an assembly comprising an element selected from the group consisting of uranium, thorium and mixtures thereof, clad in stainless steel, zirconium or a zirconium alloy consisting essentially of zirconium and containing minor amounts of nickel, chromium, tin, iron and combinations thereof; said method comprising:

perforating the cladding material to expose the selected element;

reacting said selected element with hydrogen at a temperature of from 450° C. to 680° C. and a hydrogen pressure of from 360 to 1400 torr for a time sufficient to form a hydride of substantially all of the selected element;

increasing the temperature to a range of from about 700° C. to 900° C. to dehydride the selected element to reduce it back to its elemental form;

separating the cladding material from the selected element; and recovering the selected element in a friable particulate readily comminutable form.

2. The method of claim 1 wherein the selected element is hydrided and dehydrided from two to four times.

3. The method of claim 1 wherein the selected element is hydrided and dehydrided at least three times.

4. The method of claim 1 wherein in the hydriding step the selected element is thermally cycled between the temperatures of from 450° C. to 680° C.

5. The method of claim 1 wherein the selected element is reacted with hydrogen at a temperature within the range of from about 500° C. to 650° C. and at a hydrogen pressure of about 760 torr.

6. The method of claim 1 wherein the selected element is a mixture of thorium and uranium.

* * * * *